April 4, 1950     H. C. JONES     2,502,571
SNAP-ON EGG BEATER

Filed Jan. 14, 1949     2 Sheets-Sheet 1

INVENTOR.
HARRY C. JONES
BY
McMorrow, Berman + Davidson
ATTORNEYS

April 4, 1950     H. C. JONES     2,502,571
SNAP-ON EGG BEATER
Filed Jan. 14, 1949     2 Sheets-Sheet 2
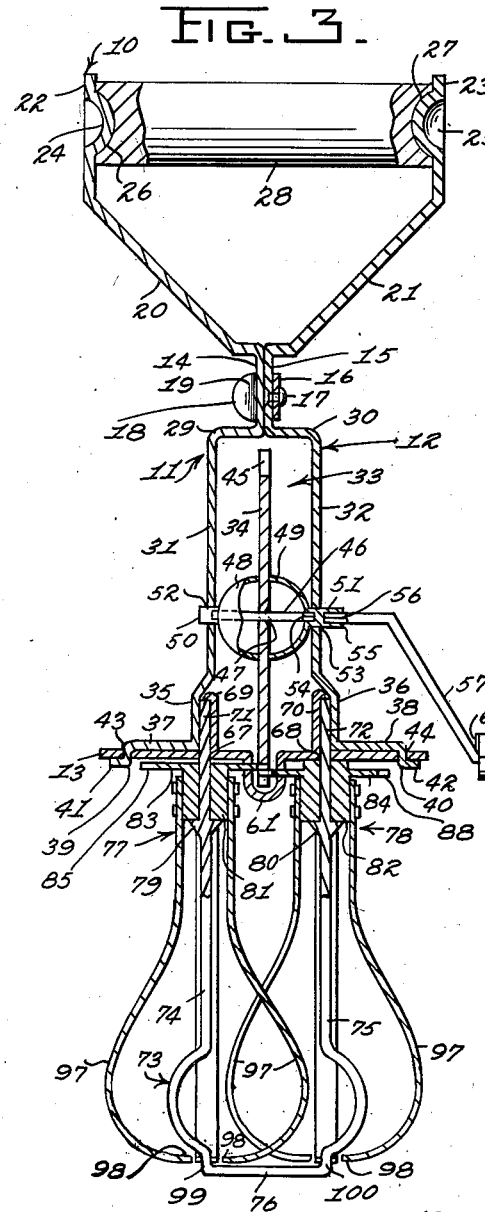
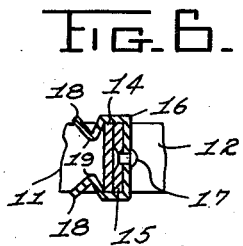
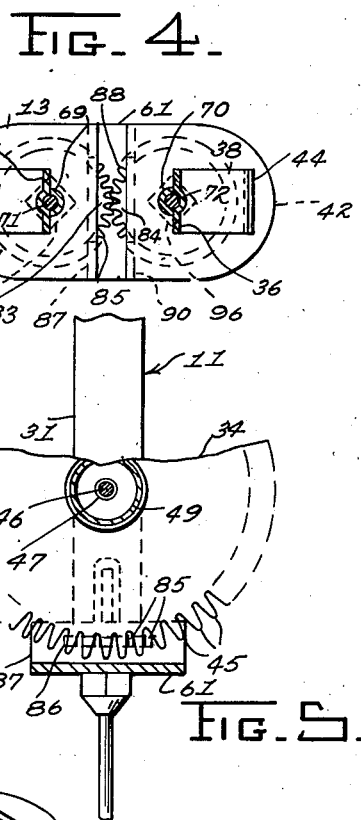
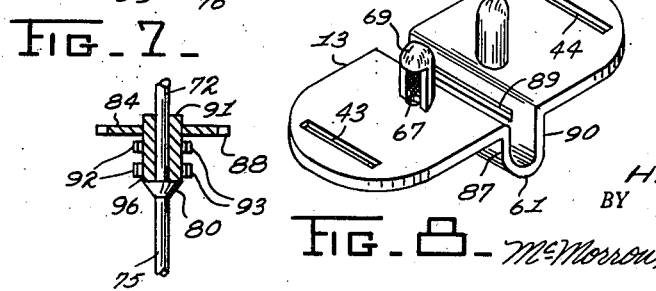
INVENTOR.
HARRY C. JONES
BY
McMorrow, Berman & Davidson
ATTORNEYS Patented Apr. 4, 1950

2,502,571

UNITED STATES PATENT OFFICE 2,502,571

SNAP-ON EGG BEATER

Harry C. Jones, Magnolia, Ark.

Application January 14, 1949, Serial No. 70,941

6 Claims. (Cl. 259—131)

This invention relates to kitchen utensils and devices, such as egg beaters, and particularly to a separable, sanitary egg beater which I prefer to term a snap-on egg beater.

The main object of my invention is to provide sanitary and easily cleaned means for beating eggs, whipping cream and for other purposes, which may be completely taken apart and dismantled for thoroughly cleaning and sterilizing the same throughout, so that it will be entirely sterile and sanitary when used for the beating or whipping operation.

Another object is to provide a separable egg beater in which not only the beaters or agitators may be removed, for washing and sterilizing, but also the frame, drive gear, hand crank and other parts may be disassembled to allow individual cleaning of every part before reassembling the beater as a whole.

A further object is to have a separable egg beater of the indicated character which is quickly reassembled and virtually snapped together for use in a convenient manner.

It is also an object of the invention to build up the beater of several simple parts which are easily manufactured and readily replaced when worn out or lost, so that the egg beater may be used indefinitely.

Other objects and advantages of the invention will appear in further detail as the specification proceeds.

In order to facilitate ready comprehension of this invention for a proper appreciation of the salient features thereof, the invention is illustrated on the accompanying drawings forming part hereof, and in which:

Figure 3 is a vertical section taken on line 3—3 in Figure 2, some parts being shown merely in fragmentary section;

Figure 4 is a transverse section taken on line 4—4 in Figure 1;

Figure 5 is a partial section taken on line 5—5 in Figure 1;

Figure 6 is a transverse section taken on line 6—6 in Figure 1;

Figure 7 is a fragmentary section of detail:

Figure 8 is an enlarged perspective view of the transverse frame member of Figures 1, 2, 3 and 4.

Throughout the views, the same reference numerals indicate the same or like parts.

Figure 1:
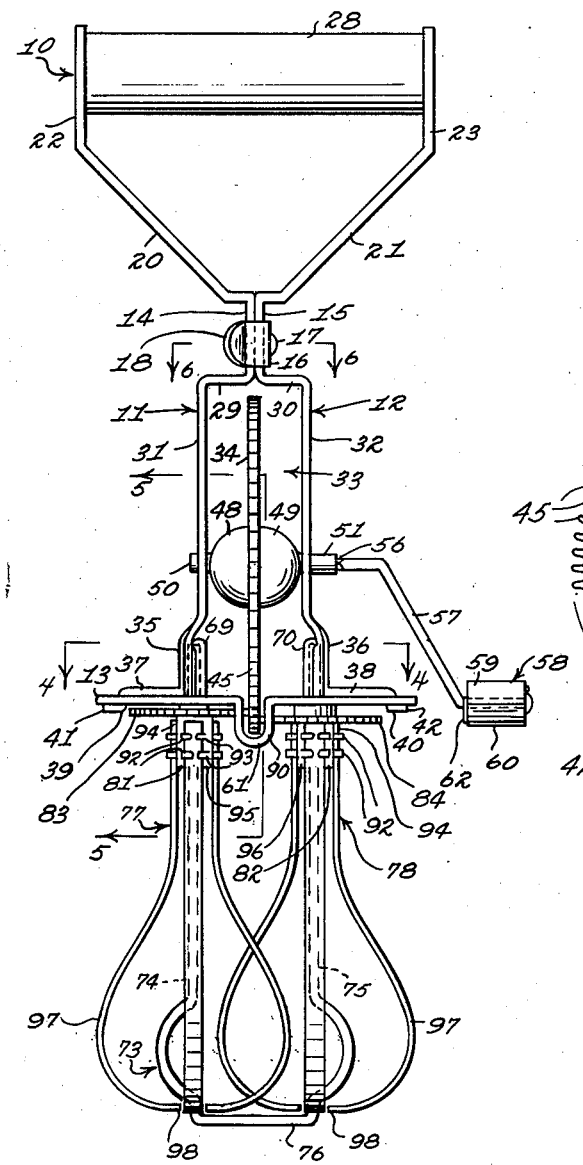
Figure 1 is a front elevation of an egg beater made according to the invention and embodying the same in a practical form.
Figure 2:
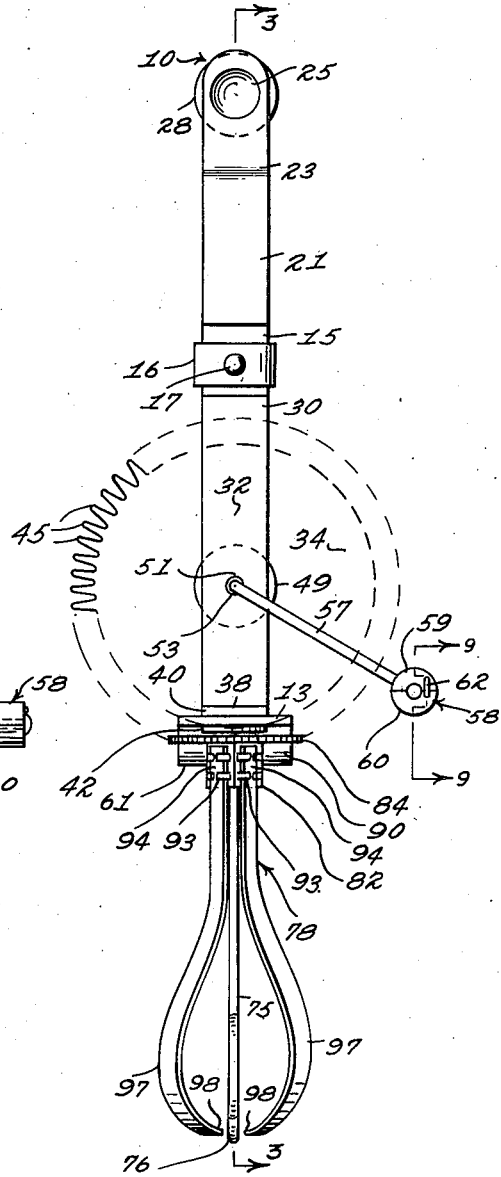
Figure 2 is a side elevation of the same egg beater as seen from the right in Figure 1.

It need scarcely be stated that it is a matter of common knowledge that everything that has to do with the preparation of food must be sanitary and of such nature as to be capable of being cleaned and kept free of grains and traces of food, germs and dirt and the like. Some devices about the kitchen, such as egg beaters and similar mechanical devices are customarily immersed in hot water or rinsed thereby, but such treatment is, after all, rather perfunctory, and even if tolerably well performed, is still actually insufficient from a strictly sanitary viewpoint. In order to thoroughly clean an egg beater, it is necessary to use hot water, cleanser and a brush capable of reaching even the smallest interstices between the parts, and considerable labor would be required to effect thorough cleansing of the device. This is true despite the fact that the utmost cleanliness is actually required in order to make certain that contamination will not be caused by adhering particles of matter upon the egg beater involved.

Upon considering this problem, it has occurred to me that an egg beater or the like should be capable of being completely apart and dismantled so that the individual parts may be reached from every side and cleaned by dishcloth or brush in hot suds or water. The separable egg beater should, of course, be conveniently reassembled for use without delay as soon as cleaned and dried. As a result, I have succeeded in producing a separable egg beater as outlined which will now be more particularly described.

Hence, in the practice of my invention, and referring again to the drawings, an egg beater, generally indicated at 10, primarily includes a frame consisting of three parts, namely, two opposed frame members 11 and 12 and a transverse frame member 13 separably held together in a manner which will now be detailed. The two frame members 11 and 12 have intermediate contiguous portions 14 and 15 normally held directly in contact by means of a double-pronged spring 16 riveted or otherwise secured to frame portion 15 by means of a rivet 17 and provided with a pair of flaring retaining members 18, 18 capable of being forcibly separated for inserting or releasing the opposite frame member 14 into or from between the inwardly extending opposite jaws 19 within the flaring members 18, the construction being best shown in section of Figure 6. Above the contiguous intermediate portions 14 and 15 of the frame members 11 and 12, these members diverge at 20, 21 equal distances toward the sides and then are bent upwardly to form opposite parallel handle-gripping ends 22, 23. Within the upper ends of the parallel members 22 and 23, the latter are hemispherically indented, as indicated at 24 and 25, to fit in dished recesses 26 and 27 in the ends of a substantially cylindrical handle member 28. If the latter is contoured and the indented portions 24 and 25 are solid instead of being indented, the purposes of the invention are still served.

Below the intermediate frame members 14 and 15, the frame sections 11 and 12 are bent outwardly a short distance in opposite directions and then downwardly again in parallelism to form the shoulders 29 and 30 and the depending parallel spaced legs 31 and 32 providing a working space 33 between them for a hand-operated gear 34 of which more later. The lower portions of pendent legs 31 and 32 are bent apart at 35 and 36 and then abruptly bent outwardly in opposite directions to form the ears 37 and 38. The latter ears at their outer ends are bent downwardly to form the depending tongues 39 and 40 having outwardly-extending terminals 41 and 42. In the assembled condition of the egg beater as a whole, the depending tongues 39 and 40 extend down through a pair of transverse slots 43 and 44, best seen in Figures 3, 4 and 8, within the ends of the transverse frame member 13 with ears 37 and 38 resting on said member and the terminals 41 and 42 disposed immediately beneath the latter. Thus, by the engagement of the hook portions 39, 40 and 41 and 42 in slots 43 and 44 and ears 37 and 38 upon the upper surfaces of transverse frame member 13, an interlocked relation between the frame members is obtained, normally holding them together in assembled condition.

Figure 9:
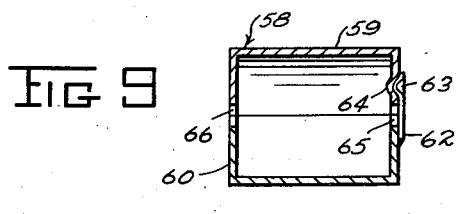
Figure 9 is an enlarged section taken on line 9—9 in Figure 2.

Returning at this point to the gear 34, it may be mentioned that the same is preferably made a flat metal disc provided upon the periphery with a series of long spur teeth 45 and mounted upon a short crank shaft 46 to which it is welded or brazed at 47. Upon both sides of gear 34 are mounted a pair of hollow, hemispherical hubs 48, 49 provided with outwardly-projecting trunnions 50, 51 extending in opposite directions through bearing holes 52, 53 in the depending legs 31 and 32 of frame members 11 and 12. The trunnion 50 upon the inside forms a socket for one end of gear shaft 46, while the other trunnion 51 forms an internally square socket for the square end 54 of shaft 46, so that rotation of trunnions 51 and thus of hub member 49 will positively rotate shaft 46 and gear 34. Exteriorly of depending leg 32 on frame member 12 the mentioned trunnion 51 also forms an internally square socket 5 for the inner square end 56 of a crank 57 provided with a rotatable, but separable, handle 58. The mentioned handle is composed of a pair of opposite shells 59, 60. In order to provide clearance for the gear 34, the transverse frame member 13 has an intermediate channel portion 61 extending downwardly a sufficient distance to clear the teeth 45, with the result that when handle 58 is gripped and crank 57 rotated, the gear 34 will be positively rotated with its hubs 48 and 49 rotating therewith and trunnions 50 and 51 rotating in bearing holes 52 and 53 in the depending frame legs 31 and 32. The two shell members 59 and 60 on handle 58 are separable, each having at the end thereof a spring provided with an inwardly-notched portion 63 formed by indenting the spring and normally engaging in a corresponding indentation on notch 64 in the other handle shell member, as best shown in Figure 9. When the two shell members 59 and 60 are assembled upon crank 57, the resulting end apertures 65 and 66 fit upon the end of the crank rotatably to allow rotation of the handle as a unit upon the end of the crank.

Preferably, frame members 11 and 12 and intermediate frame member 13 are made of strip metal, such as strip steel or the like, and the hubs and shafts and other parts, except handle 28, are also preferably made of metal, while the handle 28 may be made of wood or plastic, or any suitable material, but may also be simply a metal tube, if so desired. The remaining portions of the device about to be described are also preferably made of metal in keeping with the parts already described.

A short distance upon either side of the downwardly-extending intermediate channel 61 on transverse frame member 13 are a pair of holes 67, 68 (both appearing in Figure 3, but only one shown in Figure 8), above which are rigidly erected a pair of rigid, transversely-channeled sockets 69, 70 which are open at the outer opposite sides and register with the holes 67 and 68 in such fashion as to receive the upper ends 71 and 72 of a U-shaped support generally indicated at 73 and including a pair of upwardly-extending legs 74, 75 and the lower transverse interconnecting member 76 in such fashion as to serve as bearings for a pair of beater assemblies, generally indicated at 77 and 78.

Upon each of the legs 74 and 75 is fixed a flange, as shown at 79, 80, the flanges serving in both cases to support a pair of rotatably-mounted gear hubs 81, 82 upon the upper ends 71 and 72 of the mentioned legs 74 and 75 beneath transverse frame member 13. Upon the upper end of gear hub 81 is fixed a small pinion 83, preferably integral therewith and meshing with teeth 45 on gear 34 within channel 61, the teeth 85 extending through a slot 86 in one side 87 of channel 61 in such fashion that the slot virtually retains the hub 81 and gear 83 assembled upon the upper end 71 of leg 74 with the teeth 85 meshing with teeth 45 of the large drive gear 34. In similar fashion, upon the upper portion of hub 82 is rigidly fixed the pinion 84 having the teeth 88 thereof extending through slot 89 (Figure 8) in the other side wall 90 of channel 61 to mesh with the previously-mentioned teeth 45 on drive gear 34 at a lower level than in the case of teeth 85 of gear 83. In order to effect the proper spacing of gears 83 and 84 so that the latter will be below the former, the upper end of hub 82 is extended upwardly to form an upper spacing portion 91 engaging against the under side of transverse frame member 13. It is thus obvious that when crank 57 is rotated to cause rotation of pinion 34, the teeth 45 of the latter meshing with both gears 83 and 84 will rotate the latter simultaneously in opposite directions. In similar fashion, as in the case of pinion 83, the second gear 84 is virtually retained in assembly with frame member 13 and in position upon the upper end 72 of leg 75 by its extension through slot 89 in the side 90 of channel member 61 with the teeth 88 meshing with the teeth of drive gear 34.

The pinion hubs 81 and 82 are preferably square, or at least polygonal in cross-section, and provided upon each side with pairs of gripping fingers 92, 93 spaced apart and projecting toward each other in effective positions to frictionally hold the upper ends 94, 94 of beaters or agitators 97 upon the flat sides 95, 96 of hubs 81 and 82. The lower outwardly-arched portions of the individual beaters or agitators 97, 97 terminate at the lower ends in inwardly-arched extremities 98, 98 in such position as to be rotatable about, but out of contact with, the lower ends of legs 74 and 75 at 99 and 100 when drive gear 34 is rotated by operation of crank 57.

When the mentioned crank is rotated by grasping handle 58 in one hand to rotate the drive gear 34 and the egg beater held upright by means of handle 28 held in the other hand, the beater 97 will rotate about the two upper ends 71 and 72 of legs 74 and 75, the beaters of assembly 77 rotating in the opposite direction to that in which the beaters of assembly 78 rotate, so that operation is substantially conventional, except for the omission of any connection between the lower ends 98 of the beaters or pivoting thereof about the lower ends 99 and 100 of legs 74 and 75. The latter feature contributes to the assembling and disassembling of the egg beater as a whole.

In other words, after the device has been used and is to be cleaned, the individual beaters 97, 97 are withdrawn downwardly from between the retaining fingers 92 and 93 on hubs 81 and 82, and then the upper intermediate portions 14 and 15 of frame members 11 and 12 are separated by dissociating member 14 from the spring 16 by separating the jaws 19, performed by pulling members 14 and 15 apart, and also pulling crank 57 free of the socket-shaped trunnion 51. Thereafter, the frame members 11 and 12 are spread apart at the upper ends, freeing trunnions 50 and 51 and allowing hubs 48 and 49 to be freed from gear 34 and its shaft 46, the handle 28 between the upper members 22 and 23 of the frame portions 11 and 12 being also freed and laid aside. Upon then grasping the transverse frame member or plate 13, first one frame member 11 is lifted with its extreme lower end 41 free of slot 43 in member 13, and then also frame member 12 with its extreme lower outer end 42 lifted free of slot 44 in the same transverse frame member 13. This removal of the frame members 11 and 12 from the transverse frame member or plate 13 frees the upper ends 71 and 72 of legs 74 and 75 from their normally gripped friction hold against the interiors of sockets 69 and 70 so that the U-shaped member consisting of legs 74 and 75 and the lower transverse member 76 may readily be withdrawn downward through holes 67 and 68 in frame member 13, after which the hubs 81 and 82 with their pinions 83 and 84 are individually lifted free of said upper ends 71 and 72 of legs 74 and 75. Finally, the handle 58 is separated into its shell portions 59 and 60 by pulling these members apart, thus forcibly releasing the springs 62 at the ends thereof and thereby exposing the crank 57 from end to end without handle member 58 mounted thereon. When the parts are all thus dissociated, they may readily be cleaned in hot, soapy water with a dishcloth or brush and all dirt and germs and food traces, etc., readily removed so that every part is completely sterile.

Reassembling the egg beater is substantially a reversal of the foregoing steps, the handle shells 59 and 60 being snapped together upon the outer end of crank 57. Then, hubs 81 and 82 are mounted upon the upper ends 71 and 72 of the legs 74 and 75, whereafter these legs are thrust upwardly through holes 67 and 68 in frame member 13, taking care that pinions 83 and 84 are properly introduced from opposite sides into the slots 86 and 89 in the sides 87 and 90 of the channel portion 61 in the member 13. Thereafter, the terminals 41 and 42 of frame members 11 and 12 are introduced into end slots 43 and 44 of frame member or plate 13, the hubs 48 and 49 then assembled on shaft 46 on opposite sides of gear 34, and the trunnions 50 and 51 of said hubs introduced into the bearing holes 52 and 53 of legs 31 and 32 of the frame members 11 and 12. Just before snapping spring 16 on intermediate frame portion 15 into assembled relation with corresponding member 14, the handle 28 is inserted between upper ends 22 and 23 of the frame members. The ends 18 and jaws 19 are then allowed to snap into place about the edges of frame member 14. When the handle 58 is assembled with crank 57, it is then also assembled with the beater by inserting the crank with its square end 56 into the outer square socket portion of trunnion 51 and the main body of the beater is assembled with the widened portions 35 and 36 of legs 31 and 32 engaging frictionally against the upper ends 71 and 72 of legs 74 and 75 and holding them under pressure against the interiors of the upwardly-extending sockets 69 and 70 and thereby retaining legs 74 and 75 assembled with plate or transverse member 13. Finally, when the upper ends 94 of all the beaters 97 are inserted upwardly upon the sides 95 and 96 of hubs 81 and 82 beneath retaining fingers 92 and 93, the entire beater is assembled ready for use.

Manifestly, variations may be resorted to and parts and features may be modified or used without others within the scope of the appended claims.

Having now fully described my invention, I claim:

1. A separable beater comprising a pair of vertical frames, first means separably assembling said frames in side by side relation, said frames terminating at their upper ends in handle portions, a handle connected to and between said handle portions, said frames having laterally spaced intermediate portions and terminating at their lower ends in laterally outwardly directed ears, a transverse frame member removably positioned in engagement with the underside of said ears, second means separably connecting said ears to said transverse frame member, a manually rotatable crankshaft removably journalled transversely through the said intermediate portions of said vertical frames, a gear wheel non-rotatably mounted on said crankshaft between said intermediate portions, a pair of transversely spaced vertical sockets on said transverse frame member, a pair of vertical shafts terminating at their upper ends in terminals frictionally and separably inserted upwardly in said sockets and having retaining flanges spaced below said transverse frame member, beater hubs removably journalled on said shafts above said retaining flanges, said hubs having pinions in mesh with said gear wheel, and beater arms removably secured to circumferentially spaced points on said hubs.

2. A separable beater comprising a pair of vertical frames, first means separably assembling said frames in side by side relation, said frames terminating at their upper ends in handle portions, a handle connected to and between said handle portions, said frames having laterally spaced intermediate portions and terminating at their lower ends in laterally outwardly directed ears, a transverse frame member removably positioned in engagement with the underside of said ears, second means separably connecting said ears to said transverse frame member, a manually rotatable crankshaft removably journalled transversely through the said intermediate portions of said vertical frames, a gear wheel non-rotatably mounted on said crankshaft between said intermediate portions, a pair of transversely spaced vertical sockets on said transverse frame member, a pair of vertical shafts terminating at their upper ends in terminals frictionally and separably inserted upwardly in said sockets and having retaining flanges spaced below said transverse frame member, beater hubs removably journalled on said shafts above said retaining flanges, said hubs having pinions in mesh with said gear wheel, and beater arms removably secured to circumferentially spaced points on said hubs, said shafts terminating at their lower ends in a cross member spacing and connecting said shafts.

3. A separable beater comprising a pair of vertical frames, first means separably assembling said frames in side by side relation, said frames terminating at their upper ends in handle portions, a handle connected to and between said handle portions, said frames having laterally spaced intermediate portions and terminating at their lower ends in laterally outwardly directed ears, a transverse frame member removably positioned in engagement with the underside of said ears, second means separably connecting said ears to said transverse frame member, a manually rotatable crankshaft removably journalled transversely through the said intermediate portions of said vertical frames, a gear wheel non-rotatably mounted on said crankshaft between said intermediate portions, a pair of transversely spaced vertical sockets on said transverse frame member, a pair of vertical shafts terminating at their upper ends in terminals frictionally and separably inserted upwardly in said sockets and having retaining flanges spaced below said transverse frame member, beater hubs removably journalled on said shafts above said retaining flanges, said hubs having pinions in mesh with said gear wheel, and beater arms removably secured to circumferentially spaced points on said hubs, said shafts terminating at their lower ends in a cross member spacing and connecting said shafts, said beater arms terminating at their lower ends in radially inwardly directed terminals spaced from the lower ends of said shaft above said cross member.

4. A separable beater comprising a pair of vertical frames, first means separably assembling said frames in side by side relation, said frames terminating at their upper ends in handle portions, a handle connected to and between said handle portions, said frames having laterally spaced intermediate portions and terminating at their lower ends in laterally outwardly directed ears, a transverse frame member removably positioned in engagement with the underside of said ears, second means separably connecting said ears to said transverse frame member, a manually rotatable crankshaft removably journalled transversely through the said intermediate portions of said vertical frames, a gear wheel non-rotatably mounted on said crankshaft between said intermediate portions, a pair of transversely spaced vertical sockets on said transverse frame member, a pair of vertical shafts terminating at their upper ends in terminals frictionally and separably inserted upwardly in said sockets and having retaining flanges spaced below said transverse frame member, beater hubs removably journalled on said shafts above said retaining flanges, one of said hubs having an upwardly extending portion rotatably engaging the underside of said transverse frame member, said hubs having pinions in mesh with said gear wheel, and beater arms removably secured to circumferentially spaced points on said hubs, said transverse frame member having a central depending channel into which the lower edge of said gear wheel extends, the opposed walls of said channel being formed with horizontal slots located at different levels, the pinions on the said hubs being positioned on corresponding levels and arranged to extend through the related slots into mesh with the gear wheel whereby the slots supportably engage the related pinions.

5. A separable beater comprising a pair of vertical frames, first means separably assembling said frames in side by side relation, said frames terminating at their upper ends in handle portions, a handle connected to and between said handle portions, said frames having laterally spaced intermediate portions and terminating at their lower ends in laterally outwardly directed ears, a transverse frame member removably positioned in engagement with the underside of said ears, second means separably connecting said ears to said transverse frame member, a manually rotatable crankshaft removably journalled transversely through the said intermediate portions of said vertical frames, a gear wheel non-rotatably mounted on said crankshaft between said intermediate portions, a pair of transversely spaced vertical sockets on said transverse frame member, a pair of vertical shafts terminating at their upper ends in terminals frictionally and separably inserted upwardly in said sockets and having retaining flanges spaced below said transverse frame member, beater hubs removably journalled on said shafts above said retaining flanges, said hubs having pinions in mesh with said gear wheel, and beater arms removably secured to circumferentially spaced points on said hubs, said first means comprising a spring clip arranged to removably embrace portions of said vertical frames.

6. A separable beater comprising a pair of vertical frames, first means separably assembling said frames in side by side relation, said frames terminating at their upper ends in handle portions, a handle connected to and between said handle portions, said frames having laterally spaced intermediate portions and terminating at their lower ends in laterally outwardly directed ears, a transverse frame member removably positioned in engagement with the underside of said ears, second means separably connecting said ears to said transverse frame member, a manually rotatable crankshaft removably journalled transversely through the said intermediate portions of said vertical frames, a gear wheel non-rotatably mounted on said crankshaft between said intermediate portions, a pair of transversely spaced vertical sockets on said transverse frame member, a pair of vertical shafts terminating at their upper ends in terminals frictionally and separably inserted upwardly in said sockets and having retaining flanges spaced below said transverse frame member, beater hubs removably journalled on said shafts above said retaining flanges, said hubs having pinions in mesh with said gear wheel, and beater arms removably secured to circumferentially spaced points on said hubs, said second means comprising laterally outwardly directed tongues on the outer end of said ears, said transverse frame member being formed with transversely spaced slots through which said tongues can be inserted into engagement with the underside of said transverse frame member.

HARRY C. JONES.

REFERENCES CITED

The following references are of record in the file of this patent:

UNITED STATES PATENTS

| Number | Name | Date |
|---|---|---|
| 2,193,461 | Lienhard | Mar. 12, 1940 |